(12) United States Patent
Sato

(10) Patent No.: US 11,491,877 B2
(45) Date of Patent: Nov. 8, 2022

(54) PROTECTION CIRCUIT FOR IN-VEHICLE BATTERY

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Shinichiro Sato, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 554 days.

(21) Appl. No.: 16/487,150

(22) PCT Filed: Feb. 14, 2018

(86) PCT No.: PCT/JP2018/005117
§ 371 (c)(1),
(2) Date: Aug. 20, 2019

(87) PCT Pub. No.: WO2018/163736
PCT Pub. Date: Sep. 13, 2018

(65) Prior Publication Data
US 2019/0386350 A1    Dec. 19, 2019

(30) Foreign Application Priority Data
Mar. 7, 2017   (JP) .............................. JP2017-042971

(51) Int. Cl.
*B60L 3/00*   (2019.01)
*H01M 10/42*   (2006.01)
(Continued)

(52) U.S. Cl.
CPC ................. *B60L 3/00* (2013.01); *B60L 3/04* (2013.01); *B60L 50/60* (2019.02); *B60L 50/75* (2019.02);
(Continued)

(58) Field of Classification Search
CPC .......... B60L 58/00; B60L 58/15; B60L 58/24; B60L 50/50; B60L 50/60; H01M 10/44; H01M 10/443; H02H 7/00; H02H 7/18
(Continued)

(56) References Cited

U.S. PATENT DOCUMENTS

2005/0275383 A1* 12/2005 Ishishita ................ G01K 15/00
374/E15.001
2008/0241684 A1   10/2008 Muraoka et al.
(Continued)

FOREIGN PATENT DOCUMENTS

JP        2006-136061 A     5/2006

OTHER PUBLICATIONS

International Search Report, Application No. PCT/JP2018/005117, dated Apr. 24, 2018. ISA/Japan Patent Office.

*Primary Examiner* — Rexford N Barnie
*Assistant Examiner* — Swarna N Chowdhuri
(74) *Attorney, Agent, or Firm* — Honigman LLP

(57) ABSTRACT

A protection circuit of an in-vehicle battery has a detection unit that detects at least the temperature of the in-vehicle battery, and a control unit that controls a first relay and a second relay. The control unit performs a first switching control when either the temperature or the output current of the in-vehicle battery detected by the detection unit is in a first abnormality range in a case where the first relay is on and the second relay is off, and performs a second switching control when the temperature of the in-vehicle battery detected by the detection unit is within the first abnormality (Continued)

range or within the second abnormality range after the first switching control.

4 Claims, 7 Drawing Sheets

(51) Int. Cl.
  *B60L 58/15* (2019.01)
  *B60L 58/24* (2019.01)
  *B60L 3/04* (2006.01)
  *B60R 16/033* (2006.01)
  *H01M 10/44* (2006.01)
  *H01M 10/48* (2006.01)
  *H02H 7/18* (2006.01)
  *B60L 50/60* (2019.01)
  *B60L 50/75* (2019.01)
  *H01M 50/572* (2021.01)

(52) U.S. Cl.
  CPC ............... *B60L 58/15* (2019.02); *B60L 58/24* (2019.02); *B60R 16/033* (2013.01); *H01M 10/4257* (2013.01); *H01M 10/443* (2013.01); *H01M 10/486* (2013.01); *H01M 50/572* (2021.01); *H02H 7/18* (2013.01); *B60Y 2200/91* (2013.01); *B60Y 2200/92* (2013.01); *H01M 2010/4271* (2013.01); *H01M 2220/20* (2013.01)

(58) Field of Classification Search
  USPC ........................................................ 361/103
  See application file for complete search history.

(56) References Cited

U.S. PATENT DOCUMENTS

| | | |
|---|---|---|
| 2013/0130075 A1 | 5/2013 | Kim et al. |
| 2013/0181681 A1* | 7/2013 | Mukai .................. H02J 7/0031 |
| | | 320/128 |
| 2013/0202918 A1* | 8/2013 | Kimura ................ H02J 7/0031 |
| | | 361/88 |
| 2014/0225622 A1* | 8/2014 | Kudo ...................... B60L 58/13 |
| | | 324/433 |
| 2014/0320070 A1* | 10/2014 | Nakamoto ............. B60L 58/15 |
| | | 320/136 |
| 2015/0333381 A1* | 11/2015 | Lux ..................... H01M 10/637 |
| | | 429/61 |
| 2015/0333546 A1* | 11/2015 | Ono ..................... G01R 31/382 |
| | | 324/426 |
| 2016/0201634 A1* | 7/2016 | Kim .................. H02J 7/007194 |
| | | 320/136 |
| 2017/0179552 A1 | 6/2017 | Lux et al. |
| 2017/0194670 A1* | 7/2017 | Kawano ................ H02J 7/0032 |
| 2020/0168867 A1* | 5/2020 | Maekawa ........... H01M 10/615 |

* cited by examiner (A)

(B)

PROTECTION CIRCUIT FOR IN-VEHICLE BATTERY

CROSS-REFERENCE TO RELATED APPLICATIONS

This application is the U.S. national stage of PCT/JP2018/005117 filed on Feb. 14, 2018, which claims priority of Japanese Patent Application No. JP 2017-042971 filed on Mar. 7, 2017, the contents of which are incorporated herein.

TECHNICAL FIELD

The present disclosure relates to a protection circuit for an in-vehicle battery.

BACKGROUND

Battery protection circuits that protect chargeable batteries from overcurrent, over-discharging, over-charging, and the like are conventionally known. For example, JP 2006-136061A discloses an overcurrent protection device with the aim of protecting a secondary battery from overcurrent caused by short circuiting of the load of the secondary battery, and provided between the secondary battery and output terminals of the secondary battery is an overcurrent detection means for detecting overcurrent and a field effect transistor for controlling discharging, which switches off when overcurrent occurs. If this overcurrent detection means detects an overcurrent state in the secondary battery, then the overcurrent protection device protects the secondary battery by causing the field effect transistor for controlling discharge to switch off, thus disconnecting the load and the like from the secondary battery.

However, the overcurrent protection device disclosed in JP 2006-136061A is configured to detect overcurrent in conduction paths between the secondary battery and the output terminals thereof, and therefore it is possible to detect an overcurrent state of an output current that arises from a short circuit or the like occurring in an external circuit, but it is difficult to detect an overcurrent state caused by an abnormality in the secondary battery itself. For example, if metal deposits (dentride) form in an electrode of a battery cell due to the secondary battery being repeatedly charged and discharged and an internal short circuit occurs in the battery cell due to the deposits passing through a separator, or if an internal short circuit occurs in the battery cell due to a foreign body entering into the battery cell, a conventional overcurrent protection circuit such as that disclosed in JP 2006-136061A cannot detect abnormalities, and thus cannot adequately perform a protective operation.

The present disclosure was made based on the circumstances described above, and an object thereof is to provide a protection circuit for an in-vehicle battery that can detect internal short circuits that occur in the in-vehicle battery itself, and can perform a protective operation if an internal short circuit occurs.

SUMMARY

A protection circuit for an in-vehicle battery according to the present disclosure, includes a first relay that is positioned on a first conduction path that is a path for supplying power from the in-vehicle battery to an external circuit, the first relay being configured to switch on or off the supply of power from the in-vehicle battery to the external circuit. A discharge circuit includes a second relay and a resistor unit that are connected in series on a path that is different from the first conduction path, the discharge circuit is configured to allow current from the in-vehicle battery to flow via the resistor unit when the second relay is in an on state. A detection unit is configured to detect at least one of a temperature of the in-vehicle battery and an output current from the in-vehicle battery. A control unit is configured to, when at least one of the temperature and the output current detected by the detection unit is within a first abnormality range in a case where the first relay is in the on state and the second relay is in an off state, perform a first switching control for switching the first relay to the off state while keeping the second relay in the off state, and, when the temperature of the in-vehicle battery detected by the detection unit is within the first abnormality range or a second abnormality range after the first switching control, perform a second switching control for switching the second relay to the on state while keeping the first relay in the off state.

Advantageous Effects of Disclosure

The protection circuit for the in-vehicle battery of the present disclosure performs the first switching control if at least one of the temperature or the output current detected by the detection unit is within the first abnormality range while the first relay is on and the second relay is off, and switches the first relay off while keeping the second relay switched off. In other words, if the temperature or output current of the in-vehicle battery is abnormal when the supply of current via the second relay is stopped and current is supplied via the first relay, it is possible to stop the supply of current by switching off both the first relay and the second relay. At this time, the in-vehicle battery and the external circuit are electrically disconnected, and therefore if the abnormality of the output current arises from an abnormality in the external circuit, then there is a higher likelihood that the abnormal state will be resolved. Furthermore, if the abnormal temperature is not resolved even after both the first relay and the second relay are switched off in this way, the second relay can be switched on with a second switching control and current can thus flow from the in-vehicle battery via the second relay and a resistor unit. If the abnormal temperature cannot be resolved even after both the first relay and the second relay are switched off, there is a high likelihood that an internal short circuit has occurred in the battery, and in such a case, electrical energy stored in the in-vehicle battery can be released, and thus it is possible to protect the in-vehicle battery from generated heat.

DETAILED DESCRIPTION OF PREFERRED EMBODIMENTS

Figure 1:
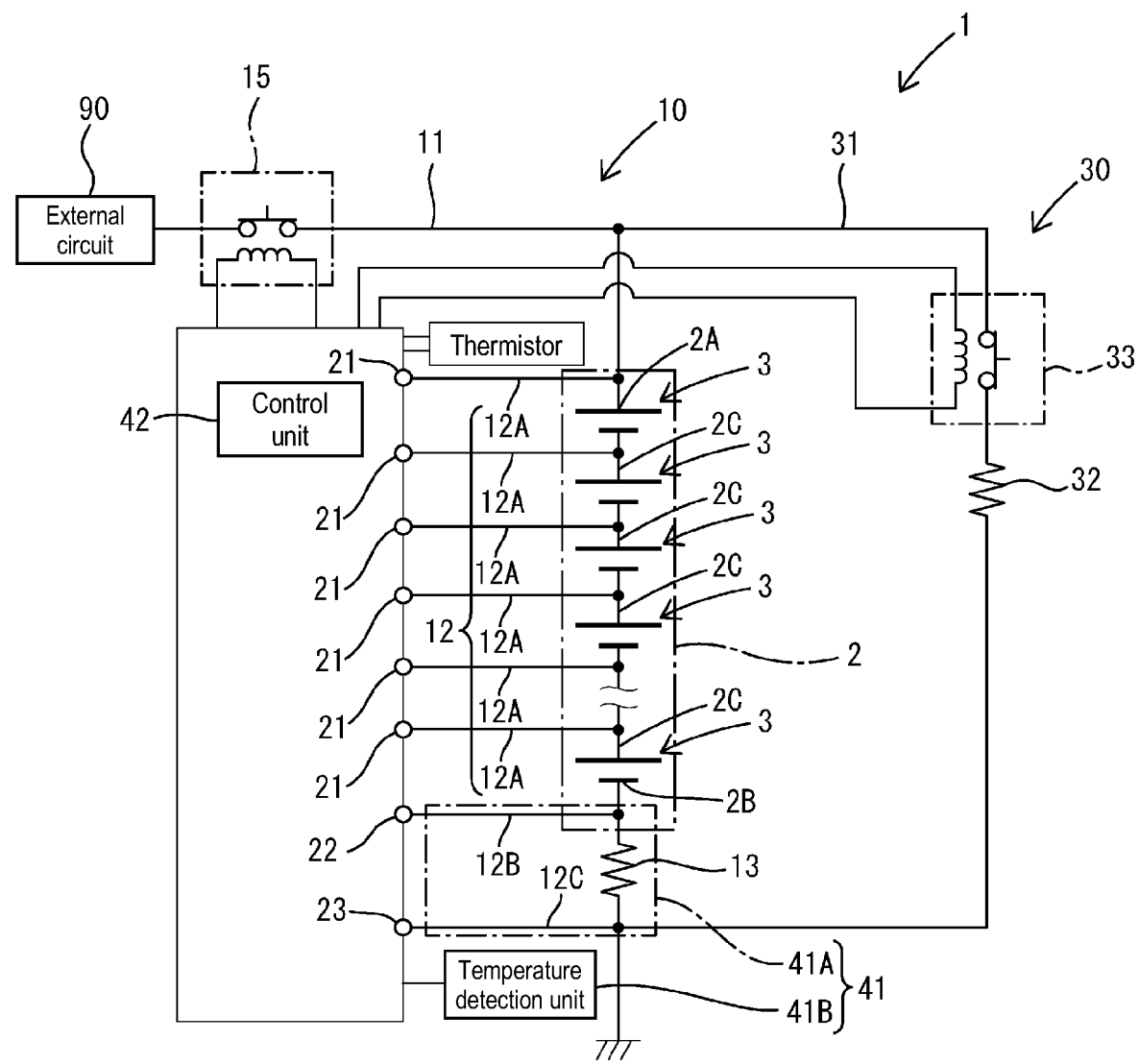
FIG. 1 is a circuit diagram schematically illustrating an in-vehicle battery system including a protection circuit of a first embodiment.

The following describes preferable examples of the disclosure.

A detection unit in a protection circuit of an in-vehicle battery may also include a current detection unit that detects the output current from the in-vehicle battery, and a temperature detection unit that detects the temperature of the in-vehicle battery. The control unit may also operate so as to perform a first switching control when the output current of the in-vehicle battery detected by the current detection unit is within a first abnormality range when the first relay is on and the second relay is off, and perform a second switching control when the temperature of the in-vehicle battery detected by the temperature detection unit is within a second abnormality range after the first switching control.

In this way, by monitoring the output current with the current detection unit and switching the first relay off with the first switching control if the output current is abnormal, it is possible to promptly detect an abnormal state if there is a rise in the output current caused by a short circuit in an external circuit, a short circuit in the battery, or the like, and thus it is more likely that a protective operation will be performed at an earlier stage. On the other hand, if an abnormal temperature occurs even after the first relay is switched off when the output current is abnormal, it is possible to switch the second relay on with the second switching control and thus suppress the generation of heat in the battery by forcing energy to be consumed outside of the battery.

In the protection circuit of the in-vehicle battery, the detection unit may also include a temperature detection unit that detects the temperature of the in-vehicle battery. The control unit may also operate so as to perform a first switching control when the temperature of the in-vehicle battery detected by the temperature detection unit is within a first abnormality range when the first relay is on and the second relay is off, and perform the second switching control when the temperature of the in-vehicle battery detected by the temperature detection unit is within a first abnormality range or a second abnormality range after the first switching control.

In this way, by monitoring the temperature of the in-vehicle battery and switching the first relay off with the first switching control when the temperature is abnormal, it is possible to more promptly detect the state of heat in the battery, and thus it is more likely that a protective operation will be performed at an earlier stage. In particular, there is a high likelihood that an internal short circuit will be detected even if the output current does not fluctuate or if the amount of fluctuation thereof is small.

The protection circuit of the in-vehicle battery may be configured such that a first abnormality range is greater than or equal to a predetermined first temperature, and the a second abnormality range is greater than or equal to a second temperature that is greater than the first temperature.

Thus, it is possible to more reliably detect that an abnormal temperature has not been resolved when the first relay is off, allow discharge current to flow in a state in which there is a high likelihood that an internal short circuit has occurred, and thus protect the in-vehicle battery.

First Embodiment

The following is a description of the first embodiment for realizing the present disclosure.

An in-vehicle battery system 1 shown in FIG. 1 includes an in-vehicle battery 2 in which a plurality of unit batteries 3 are connected in series, and a protection circuit 10 for an in-vehicle battery (hereinafter also referred to as the protection circuit 10).

The in-vehicle battery 2 is configured as a battery module in which the plurality of unit batteries 3 (battery cells) are connected in series, is a power storage means that can function as an in-vehicle power source, and is installed in a vehicle as a power source of a drive motor of an electric car (such as an EV or an HEV) for example. This in-vehicle battery 2 is configured as, for example, a series connection body in which the plurality of unit batteries 3, which are composed of lithium-ion secondary batteries, nickel-hydrogen secondary batteries, or the like, are connected in series. Also, the in-vehicle battery 2 is connected to an external circuit 90, such as a charging/discharging circuit or an electrical load, via a first conduction path 11 and thus supplies power to the external circuit 90 via the first conduction path 11. Note that some of the unit batteries 3 are omitted from FIG. 1, and the signal lines corresponding to the omitted unit batteries 3 are also omitted.

The external circuit 90 is supplied with power from the in-vehicle battery 2 via the first conduction path 11, and it is sufficient that the external circuit 90 is a circuit that can supply the power supplied from the in-vehicle battery 2 via the first conduction path 11 to various electrical components (various in-vehicle electronic components such as an ECU, an actuator, or a sensor), and is not limited to any particular type of circuit, any specific configuration, or the like.

The in-vehicle battery 2 shown in FIG. 1 has a high voltage electrode unit 2A (hereinafter also referred to as electrode unit 2A) that is an end electrode unit on the high voltage side (high potential side) of a connection body in which the unit batteries 3 are connected in series. A low voltage electrode unit 2B (hereinafter also referred to as electrode unit 2B) is an end electrode unit on the low voltage side (low potential side) of the connection body in which the unit batteries 3 are connected in series. Inter-battery electrode units 2C (hereinafter also referred to as electrode units 2C) are electrode units that are between the unit batteries of the connection body in which the unit batteries 3 are connected in series.

The protection circuit 10 includes a signal line group 12, a shunt resistor 13, a temperature sensor 14, a first relay 15, a monitoring circuit unit 20, a discharge circuit 30, and the like.

The signal line group 12 includes a plurality of voltage signal lines 12A, a voltage signal line 12B, and a voltage signal line 12C. The plurality of voltage signal lines 12A are electrically connected to the electrode units 2A and 2C of the in-vehicle battery 2. The voltage signal line 12B is electrically connected to the electrode unit 2B of the in-vehicle battery 2 and one end of the shunt resistor 13. The voltage signal line 12C is electrically connected to the other end of the shunt resistor 13.

The shunt resistor 13 is connected in series to the in-vehicle battery 2. Specifically, one end of the shunt resistor 13 is connected to the low voltage electrode unit 2B of the in-vehicle battery 2 and to the voltage signal line 12B, and the other end of the shunt resistor 13 is connected to the voltage signal line 12C and to ground. Also, an analogue voltage signal is input to each of input terminals 22 and 23, the analogue voltage signal indicating the voltage of the connection position of voltage signal lines 12B and 12C in the in-vehicle battery 2.

The temperature sensor 14 is a known temperature sensor such as a thermistor, and is configured to detect voltage values that indicate the temperature of the position at which the temperature sensor 14 is arranged and output the detected voltage values to the later-described monitoring circuit unit 20. The temperature sensor 14 is fixed in such a manner that the temperature sensor 14 comes into contact with a surface portion of the in-vehicle battery 2 and outputs a value indicating the temperature (external surface temperature) of the surface portion of the in-vehicle battery 2 as a detection value. Note that the temperature sensor 14 may also be arranged in the vicinity of the in-vehicle battery 2 without being in contact with the in-vehicle battery 2.

The monitoring circuit unit 20 is an integrated circuit (monitoring IC) that protects the in-vehicle battery 2. For example, the monitoring circuit unit 20 includes a microcomputer that has a CPU, and the CPU includes a ROM for storing information such as a program, a RAM for storing temporarily generated information, and the like.

The monitoring circuit unit 20 (specifically, a control unit 42 of the monitoring circuit unit 20) monitors the temperature, output voltage, output current, and the like of the in-vehicle battery 2. For example, the monitoring circuit unit 20 acquires a detection value (a value indicating the temperature (external surface temperature) of a surface portion of the in-vehicle battery 2) that is output by the temperature sensor 14. Also, the monitoring circuit unit 20 detects at least one of input voltages that are input via each of the voltage signal lines 12A and the voltages between signal lines in the plurality of voltage signal lines 12A. Specifically, the monitoring circuit unit 20 includes a plurality of input terminals 21 to which the plurality of voltage signal lines 12A are connected, analogue voltage signals are input to the input terminals 21, the analogue voltage signals indicating the voltages (potentials) of the connection positions of the voltage signal lines 12A in the in-vehicle battery 2. Thus it is possible to detect the terminal voltages of the unit batteries 3 by detecting the potential difference between the voltage signal lines 12A based on these analogue voltage signals.

Also, the monitoring circuit unit 20 detects the potential different (the voltages at both ends) of both ends of the shunt resistor 13. Specifically, the voltage signal line 12B is connected to one end of the shunt resistor 13 and the voltage signal line 12C is connected to the other end of the shunt resistor 13, and the monitoring circuit unit 20 detects the potential difference (the voltage at both ends) of both ends of the shunt resistor 13 based on both analogue voltage signals input via the voltage signal lines 12B and 12C, and calculates the value of the current (the value of the output current) that flows through the shunt resistor 13, the calculation being based on the detected voltages at both ends of the shunt resistor 13 and a predetermined resistance value of the shunt resistor 13.

The first conduction path 11 is a path for supplying power from the in-vehicle battery 2 to the external circuit 90, and is a power path for transmitting power that is output from the in-vehicle battery 2. The first relay 15 is a relay for switching on and off the supply of power from the in-vehicle battery 2 to the external circuit 90. The first relay (protection relay) 15 may be, for example, a known mechanical relay, is provided on the first conduction path 11, and switches the first conduction path 11 on or off based on a control signal from the monitoring circuit unit 20. The first relay 15 switches on when given an on signal from the monitoring circuit unit 20 (specifically, the control unit 42), and current is applied to the first conduction path 11 when the first relay 15 is ON. Accordingly, when the first relay 15 is ON, power can be supplied from the in-vehicle battery 2 to the external circuit 90 via the first conduction path 11. The first relay 15 switches off when given an off signal from the monitoring circuit unit 20 (specifically, the control unit 42), and no current is applied to the first conduction path 11 when the first relay 15 is off. Accordingly, when the first relay 15 is off, the supply of power from the in-vehicle battery 2 to the external circuit 90 is cut off.

The discharge circuit 30 includes a second relay 33 and a resistor unit 32 that are connected in series on a path that is different from the first conduction path 11, and is configured such that current from the in-vehicle battery 2 is allowed to flow via the resistor unit 32 when the second relay 33 is ON, and functions so as to consume power that is output from the in-vehicle battery 2. The discharge circuit 30 includes a second conduction path 31 that has one end electrically connected to the electrode unit 2A of the in-vehicle battery 2 and to the first conduction path 11, and another end electrically connected to the other end of the shunt resistor 13 and to ground, with the second relay 33 and the resistor unit 32 being provided on the second conduction path 31. The resistor unit 32 is a known resistor and functions so as to restrict current that flows from the in-vehicle battery 2 via the second conduction path 31 when the discharge circuit 30 is undertaking a discharging operation.

The second relay (discharge relay) 33 is a relay for switching on and off the supply of power from the in-vehicle battery 2 to the resistor unit 32. The second relay (discharge relay) 33 may be, for example, a known mechanical relay, is provided on the second conduction path 31, and switches the second conduction path 31 on or off based on a control signal from the monitoring circuit unit 20. The second relay 33 switches on when given an on signal from the monitoring circuit unit 20, and current is applied to the second conduction path 31 when the second relay 33 is ON. Accordingly, when the second relay 33 is ON, power can be supplied from the in-vehicle battery 2 to the resistor unit 32 via the second conduction path 31, and energy can be consumed by the resistor unit 32. The second relay 33 switches off when given an off signal from the monitoring circuit unit 20, and no current is supplied to second conduction path 31 when the second relay 33 is off. Accordingly, when the second relay 33 is off, the supply of power from the in-vehicle battery 2 to the resistor unit 32 is cut off.

A detection unit 41 shown in FIG. 1 functions so as to detect the output current from the in-vehicle battery 2 and the temperature of the in-vehicle battery 2. The detection unit 41 includes a current detection unit 41A and a temperature detection unit 41B.

The current detection unit 41A includes the shunt resistor 13 and the voltage signal lines 12B and 12C, and functions so as to generate a value that specifies the output current output from the in-vehicle battery 2 as a detection value.

Specifically, the voltages of both ends of the shunt resistor 13 (the voltages applied to the voltage signal lines 12B and 12C) are "values that specify the output current output from the in-vehicle battery 2", and the potential difference between both ends of the shunt resistor 13 is generated as "the detection value for specifying the output current". The monitoring circuit unit 20 keeps track of a current value I1 (output current value) of the current that flows through the shunt resistor 13 based on the potential difference between both ends of the shunt resistor 13 and the predetermined resistance value of the shunt resistor 13.

The temperature detection unit 41B is a known temperature sensor and functions so as to detect the temperature of the in-vehicle battery 2. The temperature detection unit 41B generates an analogue voltage signal that indicates the temperature (for example, the temperature of a surface portion of the in-vehicle battery 2) of the location in which the temperature detection unit 41B installed, and gives the generated analogue voltage signal to the monitoring circuit unit 20. The monitoring circuit unit 20 keeps track of a temperature T of the in-vehicle battery 2 based on a detection value (the analogue voltage signal generated by the temperature detection unit 41B) of the temperature detection unit 41B.

Note that configurations described herein are merely examples in all respects, and may be replaced with other configurations, as long as they are configurations according to which the output current of the in-vehicle battery 2 can be detected, or configurations according to which the temperature of the in-vehicle battery 2 (for example, the temperature of a surface portion, the temperature of an internal portion, the temperature of an internal portion, the temperature in the vicinity thereof, or the like) can be detected.

Next, functions that are executed by the monitoring circuit unit 20 will be described in detail.

As shown in FIG. 1, the monitoring circuit unit 20 includes the control unit 42. Functions executed by the control unit 42 may also be realized by software processing with use of an information processing device, and may also be realized by a hardware circuit. Furthermore, the functions may also be realized by separate devices, and a plurality of functions may also be realized by a common device. The following is a description of a representative example in which the control unit 42 is realized by an information processing device such as a microcomputer.

If the output current of the in-vehicle battery 2 detected by the detection unit 41, is within a first abnormality range when the first relay 15 is off and the second relay 33 is ON, the control unit 42 shown in FIG. 1 performs control (first switching control) for switching the first relay 15 off while keeping the second relay 33 switched off. Note that in the following description, a case in which output current value of the in-vehicle battery 2 detected by the current detection unit 41A is greater than or equal to a predetermined first current value Ith1 is described as a case in which "the output current of the in-vehicle battery 2 is within the first abnormality range". In other words, in the following representative example, an output current range in which the current value I1 (the value of the current that flows through the shunt resistor 13), which is specified by the detection value generated by the current detection unit 41A, is greater than or equal to the first current value Ith1 will be the "first abnormality range". Also, when the temperature of the in-vehicle battery 2 detected by the detection unit 41 is within the second abnormality range after the first switching control is performed in this manner, the control unit 42 performs control (second switching control) for switching the second relay 33 on while keeping the first relay 15 switched off. Note that in the following description, the range in which the temperature of the in-vehicle battery 2 detected by the detection unit 41 is greater than or equal to a predetermined second temperature T2 is the "second abnormality range". Specifically, a range in which the temperature T, which is specified by the detection value generated by the temperature detection unit 41B, is greater than or equal to the second temperature T2 is the "second abnormality range".

Next, the manner in which the functions of the aforementioned monitoring circuit unit 20 are realized will be described with reference to the flowchart shown in FIG. 2. The control unit 42 of the monitoring circuit unit 20 is configured to execute the control shown in FIG. 2 when a predetermined start condition is satisfied, or more specifically, the control shown in FIG. 2 is executed when the vehicle is in a predetermined operating state (for example, when the ignition switch of the vehicle is switched from off to ON).

Figure 2:
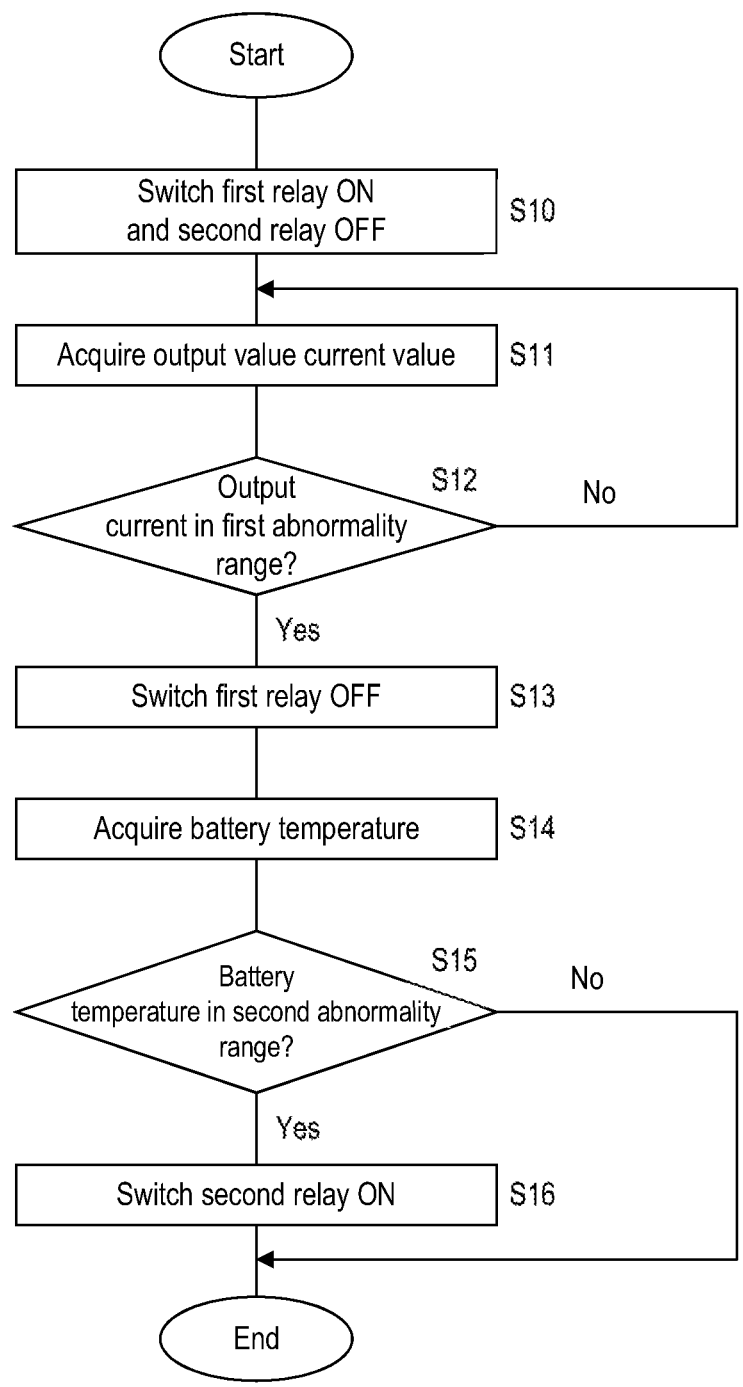
FIG. 2 is a flowchart showing a flow of control that is executed by a monitoring circuit unit of the protection circuit of the first embodiment.

After the control in FIG. 2 starts, the control unit 42 first performs the processing of step S10, in which the first relay 15 is switched on and the second relay 33 is switched off. Thus, power can be supplied from the in-vehicle battery 2 to the external circuit via the first conduction path 11 because the first relay 15 is ON, and current does not flow from the in-vehicle battery 2 to the resistor unit 32 because the second relay 33 is off.

After step S10, the control unit 42 acquires the current value of the output current that is output from the in-vehicle battery 2 (step S11). Specifically, the current value I1 of the current that flows through the shunt resistor 13 is specified based on a detection value (the voltage at both ends of the shunt resistor 13) that is generated by the current detection unit 41A, and this current value I1 is used as an output current value.

Next, the control unit 42 determines whether or not the current value I1 (the output current value from the in-vehicle battery 2) acquired in step S11 is within the first abnormality range (S12). Specifically, in step S12, it is determined whether or not the current value I1 of the current that flows through the shunt resistor 13 is greater than or equal to the first current value Ith1, and if it is determined that the current value I1 is not greater than or equal to the first current value Ith1 (No in step S12), then the processing of S11 is performed again and the processing of S11 and S12 is repeated until it is determined that the current value I1 is greater than or equal to the first current value Ith1.

On the other hand, if it is determined in step S12 that the current value I1 is greater than or equal to the first current value Ith1 (Yes in S12), the control unit 42 performs the processing of step S13 and switches the first relay 15 from on to off while keeping the second relay switched off. The processing (control) of step S13 that is executed by the control unit 42 is equivalent to an example of the "first switching control". When the first relay 15 is switched off by the control unit 42 performing the processing of step S13, current stops being supplied to the first conduction path 11 and thus the supply of power (the supply of power from the in-vehicle battery 2 to the external circuit 90) via the first conduction path 11 stops. In this way, the supply of power from the in-vehicle battery 2 to the external circuit 90 is cut off and the in-vehicle battery 2 and the external circuit 90 are electrically disconnected, and therefore, if the previously described overcurrent state (an overcurrent state in which the current value I1 is greater than or equal to the first current value Ith1) is caused by the external circuit 90, this overcurrent state can be resolved.

After step S13, the control unit 42 confirms the detection values of the temperature detection unit 41B in step S14 and acquires the temperature of the in-vehicle battery 2. In other words, the control unit 42 acquires the temperature of the in-vehicle battery 2 when both the first relay 15 and the second relay 33 are off. Note that the processing of step S14 may also be executed immediately after step S13, and may also be executed after a predetermined amount of time has passed after step S13.

Next, the control unit 42 determines whether or not the temperature of the in-vehicle battery 2 acquired in step S14 is within the second abnormality range (step S15). The "second abnormality range" is a temperature range that is set in advance by the control unit 42, more specifically, a temperature range of being greater than or equal to a predetermined second temperature T2 is used as the "second abnormality range". In step 15, the control unit 42 determines whether or not the temperature T of the in-vehicle battery 2 detected by the temperature detection unit 41B is greater than or equal to the second temperature T2, and if it is determined that the temperature T of the in-vehicle battery 2 is not greater than or equal to the second temperature T2 (that is, the temperature is not within the second abnormality range) (No in step S15), then the processing of FIG. 2 ends. For example, if the output of overcurrent from the in-vehicle battery 2 is suppressed by the processing of step S13 (processing for switching the first relay 15 off), the generation of heat in the in-vehicle battery 2 is suppressed, and thus the temperature no longer rises, there is a high likelihood that temperature of the in-vehicle battery 2 is suppressed so as to be less than the second temperature T2, and in this case processing proceeds to 'No' in step S15. Note that if processing proceeds to 'No' in step S15, then predetermined first notification processing (a notification that there is an abnormality in the external circuit) may also be performed.

On the other hand, if it is determined in step S15 that the temperature T of the in-vehicle battery 2 is greater than or equal to the second temperature T2 (that is, the temperature of the in-vehicle battery 2 is within the second abnormality range) (Yes in step S15), the control unit 42 performs the processing of step S16 and switches the second relay 33 on while keeping the first relay 15 switched off. The processing (control) of step S16 that is executed by the control unit 42 is equivalent to an example of the "second switching control". With the on operation of the second relay 33, energy stored inside the in-vehicle battery 2 is released to an external component. Note that if the processing of step S16 is executed, predetermined second notification processing (a notification that there is an abnormality in the in-vehicle battery 2) may also be performed.

Figure 3:
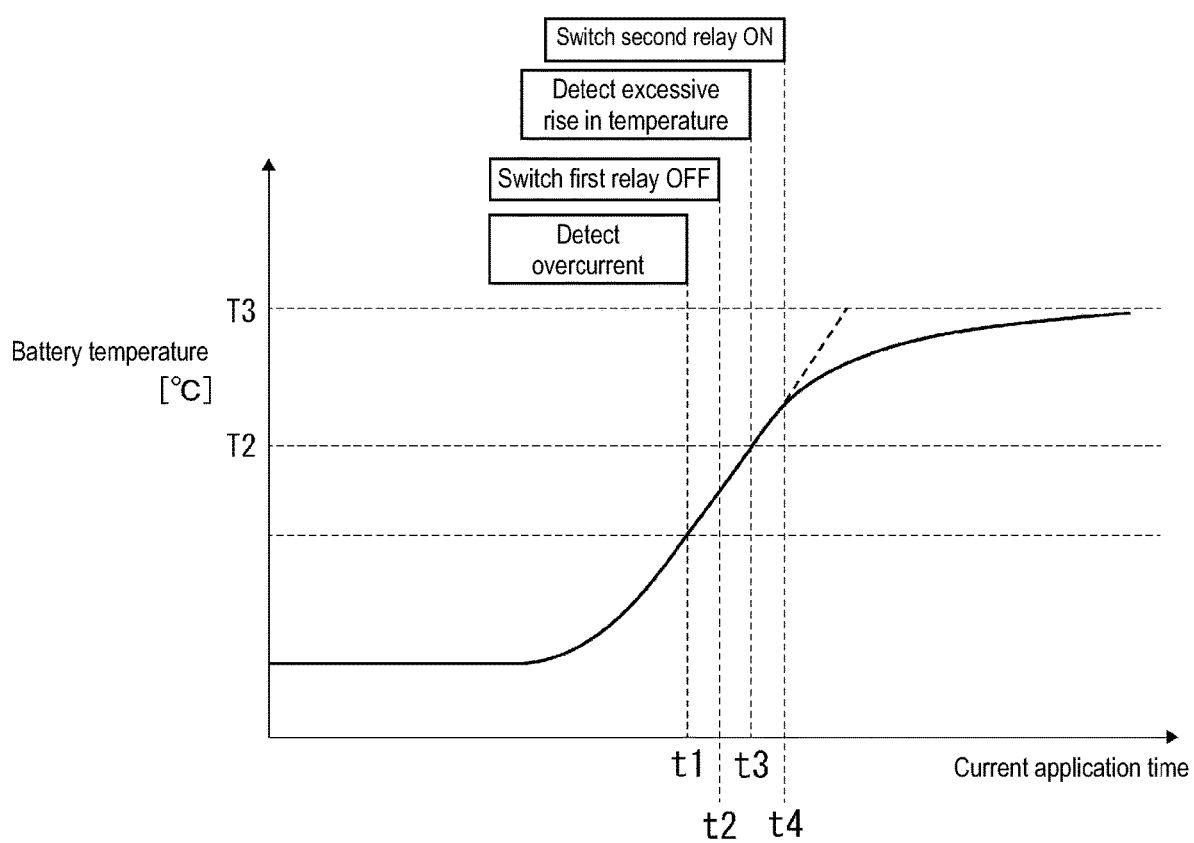
FIG. 3 is a graph illustrating the chronological change of the temperature of the in-vehicle battery if an internal short circuit has occurred, in association with controls performed by the protection circuit of the first embodiment.
Figure 4:
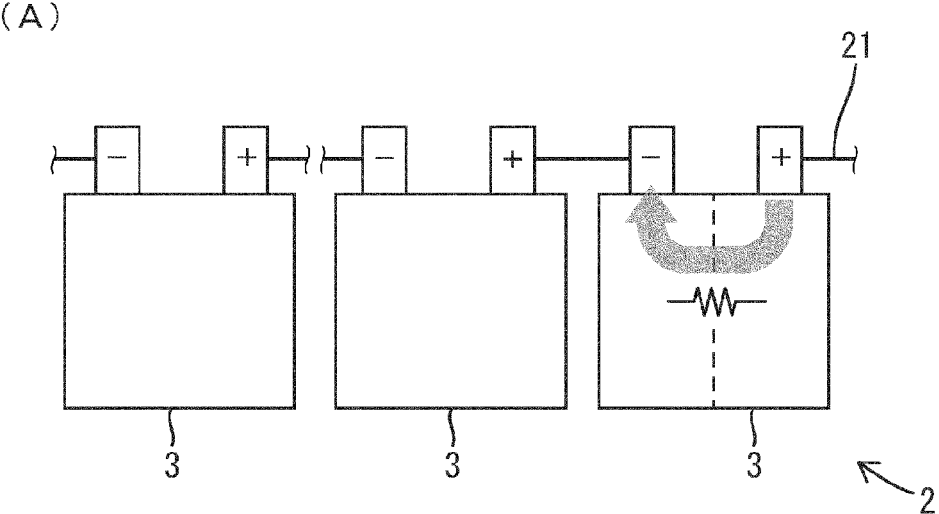
FIG. 4(A) is an illustrative diagram conceptually illustrating a state in which an internal short circuit has occurred in a unit battery.
FIG. 4(B) is an illustrative diagram conceptually illustrating an operation that allows discharge current to flow to a resistor unit if an internal short circuit has occurred in the unit battery.
Figure 4:
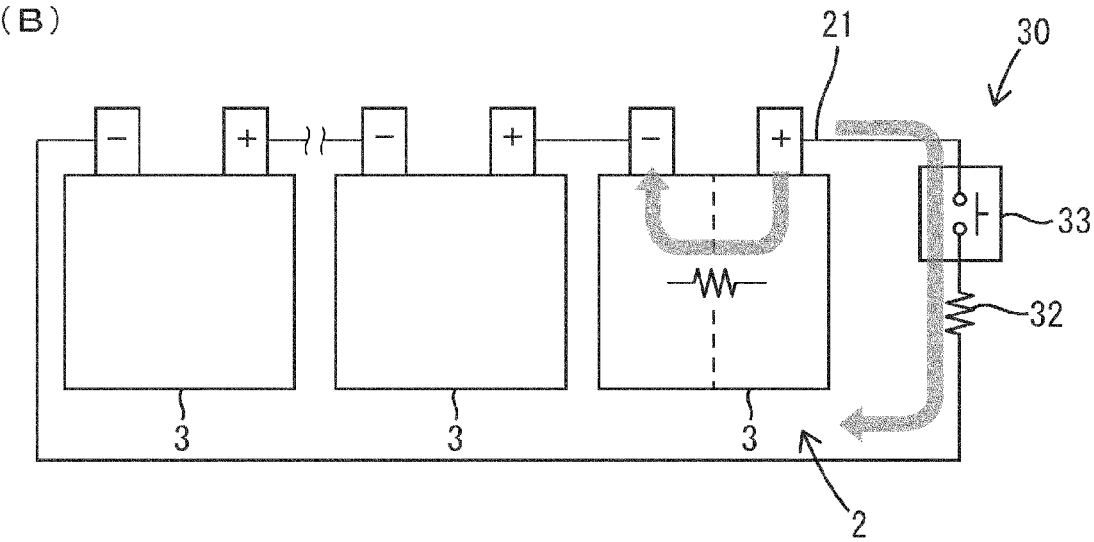

For example, as shown in FIG. 4(A), if an internal short circuit occurs in at least one unit battery 3 of the in-vehicle battery 2, there is a high likelihood that the temperature of the in-vehicle battery 2 will rise due to the occurrence of internal current arising from the internal short circuit. As shown in FIG. 3, if such an abnormality occurs, an overcurrent is detected at a time t1 and the temperature T of the in-vehicle battery 2 rises even after the first relay 15 is switched off at a time t2. With the present configuration, if the temperature T of the in-vehicle battery 2 does not fall after the first relay 15 is switched off, and the temperature T exceeds the second temperature T2 in this manner, the second relay 33 is switched on in step S16 and, as shown in FIG. 4(B), discharge current flows from the in-vehicle battery 2 via the second conduction path 31. With this operation, energy from the in-vehicle battery 2 is consumed by the resistor unit 32 and therefore it is possible to suppress the generation of heat in the in-vehicle battery 2.

Note that if a predetermined ending condition is satisfied while the control of FIG. 2 is being executed (for example, if the ignition switch of the vehicle is switched from on to off), then the control of FIG. 2 may also be ended.

Next, effects of the aforementioned configuration will be described.

In the protection circuit 10, the control unit 42 performs the first switching control when the output current detected by the detection unit 41 is within the first abnormality range when the first relay 15 is on and the second relay 33 is off, and switches the first relay 15 off while keeping the second relay 33 switched off. In other words, if the output current of the in-vehicle battery 2 is abnormal when the supply of current via the second relay 33 has stopped and current is supplied via the first relay 15, it is possible to stop the supply of current by switching off both the first relay 15 and the second relay 33. At this time, the in-vehicle battery 2 and the external circuit 90 are electrically disconnected, and therefore if the abnormality of the output current is caused by the external circuit 90, then there is a higher likelihood that the abnormal state will be resolved. Furthermore, if the abnormal temperature is not be resolved even after both the first relay 15 and the second relay 33 are switched off in this manner, the control unit 42 performs the second switching control, the second relay 33 is switched ON, and current can flow from the in-vehicle battery 2 via the second relay 33 and the resistor unit 32. If the abnormal temperature is not be resolved even after both the first relay 15 and the second relay 33 are switched off, there is a high likelihood that an internal short circuit has occurred in the battery, and in such a case, electrical energy stored in the in-vehicle battery 2 can be released and thus it is possible to protect the in-vehicle battery 2 from over-heating.

The detection unit 41 in the protection circuit 10 includes the current detection unit 41A that detects the output current from the in-vehicle battery 2, and the temperature detection unit 42B that detects the temperature of the in-vehicle battery 2. The control unit 42 performs the first switching control when the value I1 of the output current of the in-vehicle battery 2 detected by the current detection unit 41A is within the first abnormality range when the first relay 15 is on and the second relay 33 is off, and performs the second switching control if, after the first second switching control, the temperature T of the in-vehicle battery 2 detected by the temperature detection unit 41B is within the second abnormality range.

In this manner, monitoring the output current with the current detection unit 41A and switching the first relay 15 off when the output current is abnormal, it is possible to promptly detect an abnormal state if there is a rise in the output current caused by a short circuit in the external circuit 90, an internal short circuit in a battery, or the like, and thus it is more likely that a protective operation will be performed at an earlier stage. On the other hand, if an abnormal temperature occurs even after the first relay 15 is switched off when the output current is abnormal, current can be forcefully discharged by switching the second relay 33 ON, thus making it possible to suppress the generation of heat in the battery by forcing energy to be consumed outside of the battery.

Second Embodiment

Next, a second embodiment will be described.

Figure 5:
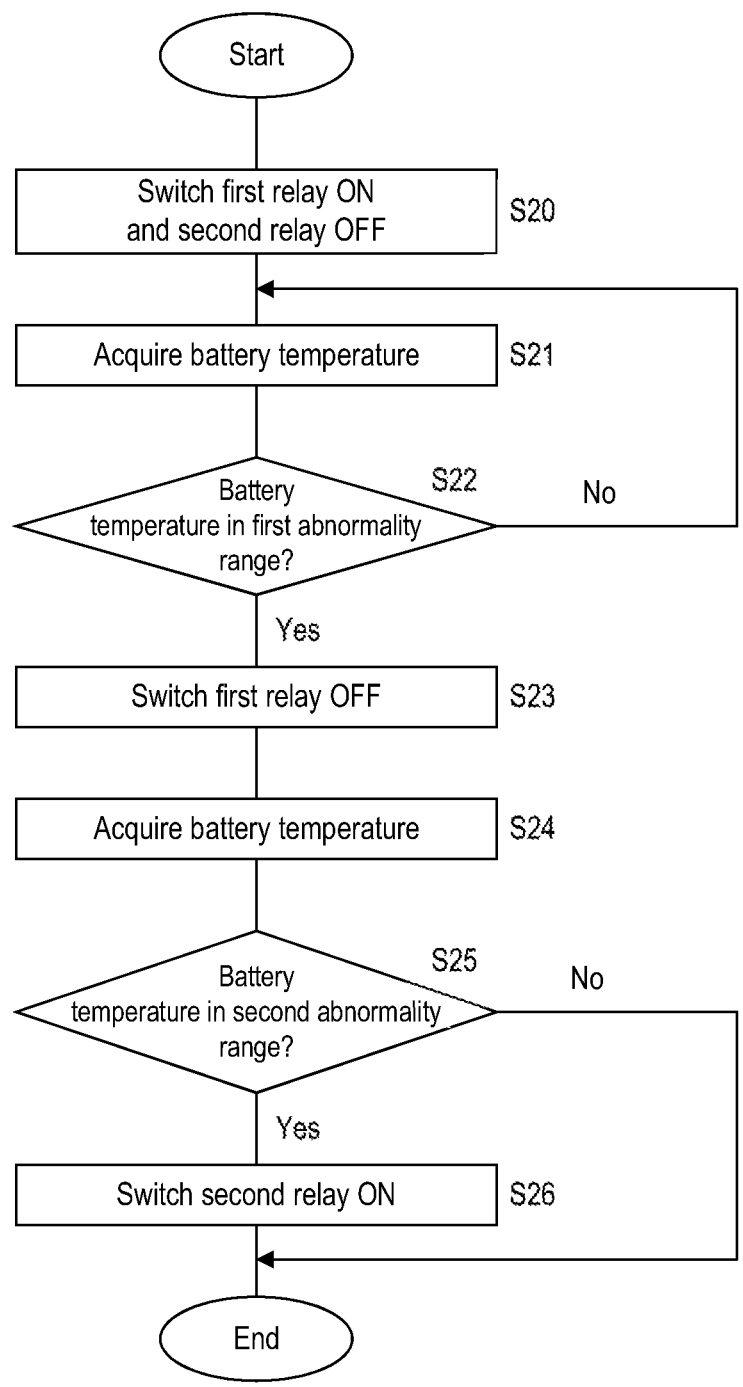
FIG. 5 is a flowchart showing the flow of control that is executed by the monitoring circuit unit of the protection circuit according to a second embodiment.

The in-vehicle battery system 1 of the second embodiment has the same hardware configuration as the in-vehicle battery system 1 of the first embodiment shown in FIG. 1. Accordingly, the following description is in reference to FIG. 1. The in-vehicle battery system 1 of the second embodiment is different only in that the control of FIG. 2 is changed to that of FIG. 5, and that the control of FIG. 5 is different from FIG. 2 only in that the control of FIG. 5 uses steps S21 and S22 instead of steps S11 and S12. In the following, detailed descriptions of the configuration and control that are the same as those of the first embodiment shall be omitted, with the description focusing on the differences from the first embodiment.

The protection circuit 10 (FIG. 1) of the second embodiment includes a monitoring circuit unit 20 (FIG. 1) that is similar to that of first embodiment, and the monitoring circuit unit 20 includes a control unit 42 that is similar to that of the first embodiment. Functions executed by the control unit 42 may also be realized by software processing with use of an information processing device, and may also be realized by a hardware circuit. Furthermore, the functions may also be realized by separate devices, and a plurality of functions may also be realized by a common devices. The following is a description of a representative example in which the control unit 42 is realized by an information processing device such as a microcomputer.

With the protection circuit 10 of the second embodiment as well, when the temperature of the in-vehicle battery 2 detected by the detection unit 41 is within a first abnormality range when the first relay 15 is on and the second relay 33 is off, then the control unit 42 functions so as to switch the first relay 15 off. Note that in the following description, a case in which the temperature T of the in-vehicle battery 2 detected by the temperature detection unit 41B is greater than or equal to a predetermined first temperature T1 will be described as a case in which "the temperature T of the in-vehicle battery 2 is within the first abnormality range". In other words, in the following representative example, the temperature range in which the temperature T, which is specified by the detection value generated by the temperature detection unit 41B, is greater than or equal to the first temperature T1 is the "first abnormality range".

Also, when the temperature T of the in-vehicle battery 2 detected by the detection unit 41 is within the second abnormality range after the first relay 15 is switched off, the control unit 42 functions so as to switch the second relay 33 on while keeping the first relay 15 switched off. Note that in the following description, the range in which the temperature T of the in-vehicle battery 2 detected by the detection unit 41 is greater than or equal to the predetermined second temperature T2 is the "second abnormality range". Specifically, a range in which the temperature T, which is specified by the detection value that is generated by the temperature detection unit 41B, is greater than or equal to the second temperature T2 (provided T2>T1) is the "second abnormality range". In this way, the first abnormality range is a range of being greater than or equal to a predetermined first temperature T1, and the second abnormality range is a range of being greater than or equal to the second temperature T2, which is greater than the first temperature T1.

Next, the manner in which the functions of the aforementioned monitoring circuit unit 20 are realized will be described with reference to the flowchart shown in FIG. 5. The control unit 42 of the monitoring circuit unit 20 is configured to execute the control shown in FIG. 5 when a predetermined start condition is satisfied, or more specifically, the control shown in FIG. 5 is executed when the vehicle is in a predetermined operating state (for example, when the ignition of the vehicle is switched from off to ON).

After the control in FIG. 5 starts, the control unit 42 first performs step S20, in which the first relay 15 is switched on and the second relay 33 is switched off. Thus, power can be supplied from the in-vehicle battery 2 to the external circuit via the first conduction path 11 because the first relay 15 is ON, and current does not flow from the in-vehicle battery 2 to the resistor unit 32 because the second relay 33 is off.

After step S20, the control unit 42 confirms the detection values of the temperature detection unit 41B in step S21 and acquires the temperature T of the in-vehicle battery 2. In other words, the control unit 42 acquires the temperature of the in-vehicle battery 2 when the first relay 15 is on and the second relay 33 is off. Then, after step S21, the control unit 42 determines whether or not the temperature T (the temperature of the in-vehicle battery 2) acquired in step S21 is within the first abnormality range (S22). The "first abnormality range" is a temperature range that is set in advance by the control unit 42, or more specifically, a temperature range of being greater than or equal to the predetermined first temperature T1 is used as the "first abnormality range". In step S22, the control unit 42 determines whether or not the temperature T of the in-vehicle battery 2 detected by the temperature detection unit 41B is greater than or equal to the first temperature T1, and if it is determined that the temperature T of the in-vehicle battery 2 is not greater than or equal to the first temperature T1 (that is, the temperature T of the in-vehicle battery 2 is not within the first abnormality range) (No in step S22), then the processing of step S21 is performed again and the processing of steps S21 and S22 is repeated until it is determined that the temperature T is greater than or equal to the first temperature T1.

On the other hand, if it is determined that the temperature T of the in-vehicle battery 2 is greater than or equal to the first temperature T1 (that is, the temperature T of the in-vehicle battery 2 is within the first abnormality range) (Yes in step S22), then the control unit 42 performs the processing of step S23, and switches off the first relay 15 while keeping the second relay switched off. The processing (control) of step S23 is executed by the control unit 42 is equivalent to an example of the "first switching control". When the control unit 42 switches the first relay 15 off, current stops being applied to the first conduction path 11 and thus the supply of power (the supply of power from the in-vehicle battery 2 to the external circuit 90) via the first conduction path 11 stops. In this way, the supply of power from the in-vehicle battery 2 to the external circuit 90 is cut off and the in-vehicle battery 2 and the external circuit 90 are electrically disconnected, and therefore, if that previously-described excessive temperature rise (an excessive temperature rise in which the temperature T of the in-vehicle battery 2 is greater than or equal to the first temperature T1) is caused by the external circuit 90, this excessive temperature rise can be resolved.

After step S23, the control unit 42 confirms the detection values of the temperature detection unit 41B in step S24 and acquires the temperature of the in-vehicle battery 2. In other words, the control unit 42 acquires the temperature of the in-vehicle battery 2 when both of the first relay 15 and the second relay 33 are off. Note that the processing in step S24 may also be executed immediately after step S23, and may also be executed after a predetermined amount of time has passed after step S23.

Next, the control unit 42 determines whether or not the temperature of the in-vehicle battery 2 acquired in step S24 is within the second abnormality range (step S25). The "second abnormality range" is a temperature range that is set in advance by the control unit 42, or more specifically, a temperature range of being greater than or equal to a predetermined second temperature T2 (T2>T1) is used as the "second abnormality range". In step S25, the control unit 42 determines whether or not the temperature T of the in-vehicle battery 2 detected by the temperature detection unit 41B is greater than or equal to the second temperature T2, and if it is determined that the temperature T of the in-vehicle battery 2 is not greater than or equal to the second temperature T2 (that is, the temperature is not within the second abnormality range) (No in step S25), then the processing of FIG. 5 ends. For example, if the output of overcurrent from the in-vehicle battery 2 is suppressed by the processing of step S23 (processing for switching the first relay 15 off), the generation of heat in the in-vehicle battery 2 is suppressed and the temperature no longer rises, then there is a high likelihood that the temperature of the in-vehicle battery 2 is suppressed to be less than the second temperature T2 and in this case processing proceeds to 'No' in step S25. Note that if processing proceeds to 'No' in step S25, then predetermined first notification processing (a notification that there is an abnormality in the external circuit) may also be performed.

On the other hand, if it is determined in step S25 that the temperature T of the in-vehicle battery 2 is greater than or equal to the second temperature T2 (that is, the temperature of the in-vehicle battery 2 is within the second abnormality range) (Yes in step S25), the control unit 42 performs the processing of step S26 and switches the second relay 33 on while keeping the first relay 15 switched off. The processing (control) of step S26 that is executed by the control unit 42 is equivalent to an example of the "second switching control". With the on operation of the second relay 33, energy stored inside the in-vehicle battery 2 is released to an external component.

Figure 6:
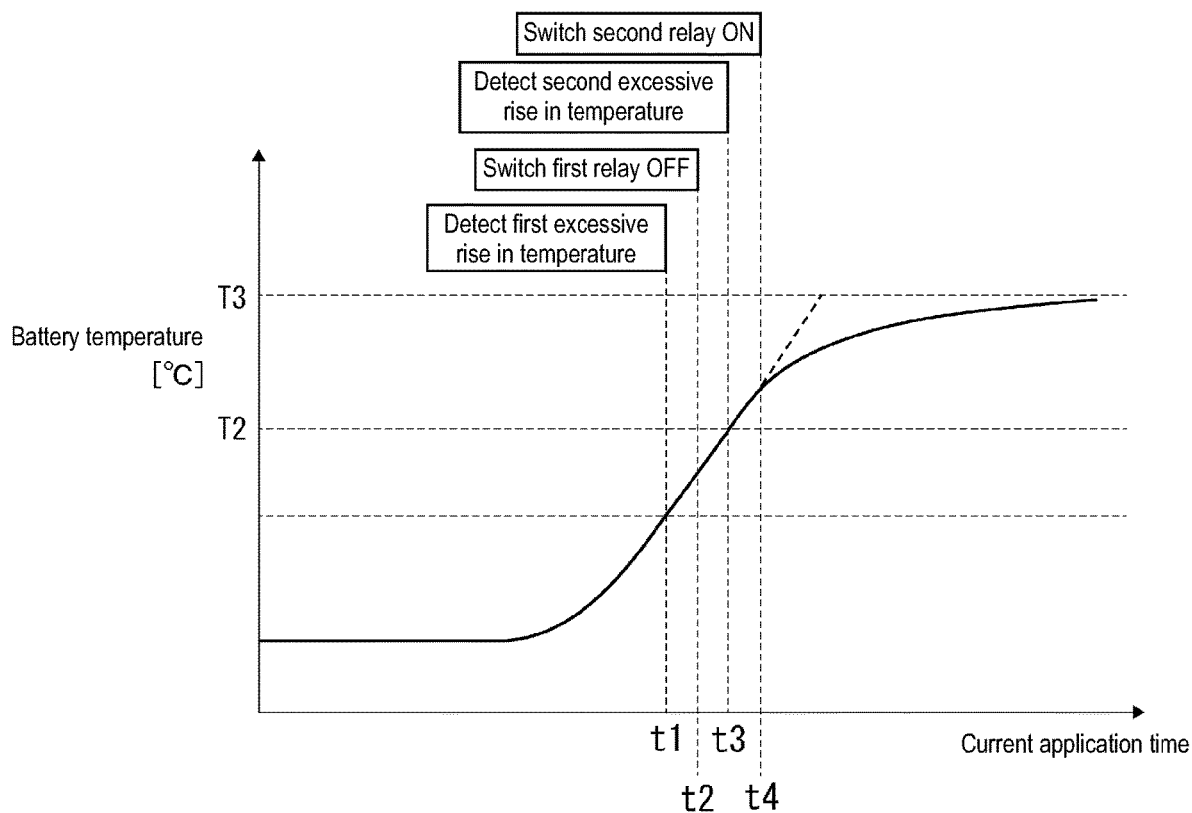
FIG. 6 is a graph illustrating the chronological change of the temperature of the in-vehicle battery if an internal short circuit has occurred, in association with controls performed by the protection circuit of the second embodiment.

For example, as shown in FIG. 4(A), if an internal short circuit occurs in at least one unit battery 3 of the in-vehicle battery 2, there is a high likelihood that the temperature of the in-vehicle battery 2 will rise due to the occurrence of internal current caused by the an internal short circuit. As shown in FIG. 6, if such an abnormality occurs, an excessive temperature rise (first temperature rise) is detected at a time t1, and if the temperature T of the in-vehicle battery 2 continues to rise even after the first relay 15 is switched off at the time t2, then there is a high likelihood of a further excessive temperature rise (second temperature rise) at a time t3, as shown in FIG. 6. With the present configuration, if the temperature T of the in-vehicle battery 2 does not fall after the first relay 15 is switched off, and the temperature T exceeds the second temperature T2, the second relay 33 is switched on in step S26 and, as shown in FIG. 4(B), discharge current flows from the in-vehicle battery 2 via the second conduction path 31. With this operation, energy from the in-vehicle battery 2 is consumed by the resistor unit 32 and therefore it is possible to suppress the generation of heat in the in-vehicle battery 2.

As described above, the protection circuit 10 of the present configuration also has fundamental effects similar to those of the first embodiment.

In the protection circuit 10 of the present configuration, the detection unit 41 includes a temperature detection unit 41B that detects the temperature of the in-vehicle battery 2. The control unit 42 performs the first switching control when the temperature of the in-vehicle battery 2 detected by the temperature detection unit 41B is within the first abnormality range when the first relay 15 is on and second relay 33 is off, and performs the second switching control when the temperature of the in-vehicle battery 2 detected by the temperature detection unit 41B is within the second abnormality range after the first switching control.

By monitoring the temperature of the in-vehicle battery 2 and switching the first relay 15 off with the first switching control when the temperature is abnormal, it is possible to more promptly detect the state of heat in the battery, and thus it is more likely that the protective operation will be performed at an earlier stage. In particular, there is a high likelihood that an internal short circuit will be detected even if the output current does not fluctuate or if the amount of fluctuation thereof is small.

With the protection circuit 10 of the present configuration, the first abnormality range is a range of being greater than or equal to a predetermined first temperature T1, and the second abnormality range is a range of being greater than or equal to the second temperature T2, which is greater than the first temperature T1.

By doing so, it is possible to more reliably detect that an abnormal temperature has not been resolved when the first relay 15 is off, allow discharge current to flow in a state in which there is a high likelihood that an internal short circuit has occurred, and thus the in-vehicle battery 2 can be protected.

Other Embodiments

The present disclosure is not limited to the embodiments described according to the above description and the drawings, and for example, embodiments such as of the following are also included within the scope of the present embodiment. Also, the previously described embodiments and the embodiments that will be described below can be combined as long as there is no contradiction therein.

Figure 7:
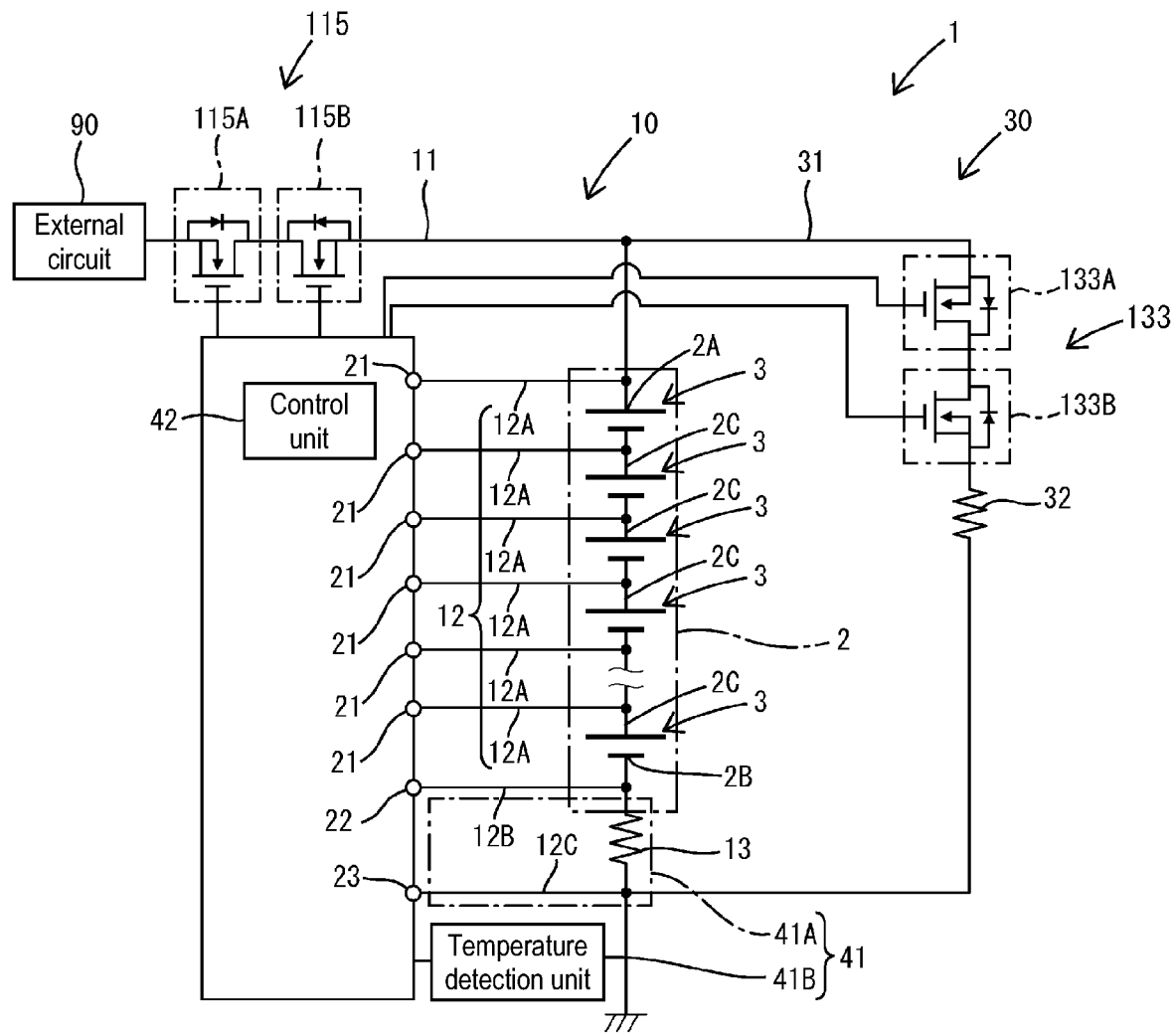
FIG. 7 is a circuit diagram schematically illustrating an in-vehicle battery system including a protection circuit of another embodiment.

With the first and second embodiments, examples were given in which the first relay 15 and the second relay 33 of the protection circuit 10 are constituted by known mechanical relays, but other configurations are also possible. For example, as shown in FIG. 7, a configuration is also possible in which the first relay 115 and the second relay 133 are constituted by switching elements. Note that the example in FIG. 7 can be similar to the first and second embodiments except that the first relay 15 is changed to a first relay 115 and the second relay 33 is changed to a second relay 133. Specifically, the first relay 115 includes a switching element 115A that is constituted by an n-channel MOSFET and a switching element 115B that is constituted by an n-channel MOSFET, which are connected in series with their drains connected to each other. The first relay 115 is switched on and off by a signal being output from the monitoring circuit unit 20 to the gates of the first relay 115. When the on signal is given from the monitoring circuit unit 20 to the first relay 115, the switching elements 115A and 115B are switched on simultaneously, and when the off signal is given from the monitoring circuit unit 20 to the first relay 115, the switching elements 115A and 115B are switched off simultaneously. In a similar way, the second relay 133 includes a switching element 133A that is constituted by an n-channel MOSFET and a switching element 133B that is constituted by an n-channel MOSFET, and the switching element 133A and the switching element 133B are connected in series with the drains thereof connected to each other. The second relay 133 is switched on and off by a signal being output from the monitoring circuit unit 20 to the gates of the second relay 133. When the on signal is given from the monitoring circuit unit 20 to the second relay 133, the switching elements 133A and 133B are switched on simultaneously, and when the off signal is given from the monitoring circuit unit 20 to the second relay 133, the switching elements 133A and 133B are switched off simultaneously.

The first embodiment shows a configuration in which, in the control of the monitoring circuit unit 20 shown in FIG. 2, it is determined in the processing of step S12 whether or not the current value of the output current from the in-vehicle battery 2 is within the first abnormality range. However, a configuration is also possible in which it is determined in step S12 whether or not at least one of the current value of the output current from the in-vehicle battery 2 and the temperature of the in-vehicle battery 2 is within the first abnormality range. That is to say, a configuration is also possible in which the current value of the output current from the in-vehicle battery 2 and the temperature of the in-vehicle battery 2 are acquired in S11, and it is determined in S12 whether or not at least one of the current value of the output current from the in-vehicle battery 2 and the temperature of the in-vehicle battery 2 acquired in S11 is within the first abnormality range (whether or not both the current value of the output current from the in-vehicle battery 2 and the temperature of the in-vehicle battery 2 is within the first abnormality range). Then, if at least one of the current value of the output current from the in-vehicle battery 2 and the temperature of the in-vehicle battery 2 are within the first abnormality range, then processing proceeds to S13. Note that the first abnormality range corresponding to the temperature of the in-vehicle battery 2 is a range that is envisioned as the temperature of the in-vehicle battery 2 in an abnormal state of the in-vehicle battery 2, in which overcurrent caused by an abnormality in an external circuit that is supplied power from the in-vehicle battery 2 occurs. Also, a configuration is possible in which the first abnormality range corresponding to the current value of the output current from the in-vehicle battery 2 and the first abnormality range corresponding to the temperature of the in-vehicle battery 2 are set so as not to correlate. That is to say, a configuration is also possible in which, when the output current of the in-vehicle battery 2 reaches the first current value Ith1, the temperature of the in-vehicle battery 2 does not reach T1.

The second embodiment shows a configuration in which, in the control of the monitoring circuit unit 20 shown in FIG. 5, the second abnormality range is used in determining whether or not there is an internal short circuit in the in-vehicle battery 2 in the processing of S25. However, a configuration is also possible in which another range is used in determining whether or not there is an internal short circuit in the in-vehicle battery 2. For example, a configuration is also possible in which the first abnormality range is used in determining whether or not there is an internal short circuit in the in-vehicle battery 2. For example, a configuration is also possible in which, if the temperature of the in-vehicle battery 2 is greater than or equal to a predetermined first temperature T1, then the temperature of the in-vehicle battery 2 is within the second abnormality range.

With the second embodiment, in the control of the monitoring circuit unit 20 shown in FIG. 5, the second abnormality range, which is used in determining whether or not there is an internal short circuit in the in-vehicle battery 2 in the processing of S25, need not be a range in which a second temperature is set to be greater than a first temperature. For example, a configuration is also possible in which, as the second abnormality range, the second temperature T2 is set to be smaller than the first temperature T1. With this configuration, it is possible to detect an abnormal state in which the temperature of the in-vehicle battery 2 is below the first temperature T1 even if there is an internal short circuit in the in-vehicle battery 2. Alternatively, a configuration is also possible in which it is determined in step S25 whether or not the temperature of the in-vehicle battery 2 is within the first abnormality range.

The first embodiment described a case in which, in the control of the monitoring circuit unit 20 shown in FIG. 5, in the processing of S15, an internal short circuit occurs in the unit battery 3 on the high potential side that has a high voltage electrode unit 2A and is in the in-vehicle battery 2, but a case is also conceivable in which an internal short circuit occurs in another unit battery 3. For example, a case in which the unit battery 3 on the low potential side that has a low voltage electrode unit 2B and is in the in-vehicle battery 2, and a case in which an internal short circuit occurs in a unit battery 3 on the inner side that constitutes the in-vehicle battery 2 can also be detected by the processing of S15. Also, a case is envisioned in which an internal short circuit occurs in a plurality of the unit batteries 3 in the processing of S15.

The invention claimed is:

1. A protection circuit for an in-vehicle battery, comprising:
    a first relay that is positioned on a first conduction path that is a path for supplying power from the in-vehicle battery to an external circuit, the first relay being configured to switch on or off the supply of power from the in-vehicle battery to the external circuit;
    a discharge circuit that includes a second relay and a resistor unit that are connected in series on a path that is different from the first conduction path, the discharge circuit being configured to allow current from the in-vehicle battery to flow via the resistor unit when the second relay is in an on state so as to consumer power from the in-vehicle battery and discharge the current to a ground;
    a detection unit configured to detect at least one of a temperature of the in-vehicle battery and an output current from the in-vehicle battery; and
    a control unit configured to switch on the first relay and switch off the second relay and subsequently receiving the temperature of the in-vehicle battery or the output current from the in-vehicle battery and performs a first switching control for switching the first relay to the off state while keeping the second relay in the off state when at least one of the temperature and the output current detected by the detection unit is within a first abnormality range in a case, and subsequently receives the temperature of the in-vehicle battery or the output current from the in-vehicle battery and performs a second switching control for switching the second relay to the on state while keeping the first relay in the off state when the temperature of the in-vehicle battery detected by the detection unit is within the first abnormality range or a second abnormality range after the first switching control, the second abnormality range being greater than the first abnormality range.

2. The protection circuit for an in-vehicle battery according to claim 1, wherein the detection unit includes a current detection unit configured to detect the output current from the in-vehicle battery, and a temperature detection unit configured to detect the temperature of the in-vehicle battery, and
    the control unit is configured to, when the output current of the in-vehicle battery detected by the current detection unit is within the first abnormality range in a case where the first relay is in the on state and the second relay is in the off state, perform the first switching control, and, when the temperature of the in-vehicle battery detected by the temperature detection unit is within the second abnormality range after the first switching control, perform the second switching control.

3. The protection circuit for an in-vehicle battery according to claim 1, wherein the detection unit includes a temperature detection unit configured to detect the temperature of the in-vehicle battery, and when the temperature of the in-vehicle battery detected by the temperature detection unit is within the first abnormality range in a case where the first relay is in the on state and the second relay is in the off state, the control unit performs the first switching control, and when the temperature of the in-vehicle battery detected by the temperature detection unit is within the first abnormality range or within the second abnormality range after the first switching control, the control unit performs the second switching control.

4. The protection circuit for an in-vehicle battery according to claim 3, wherein the first abnormality range is a range of being greater than or equal to a predetermined first temperature, and the second abnormality range is a range of being greater than or equal to a second temperature that is greater than the first temperature.

* * * * *